(12) United States Patent
Xu et al.

(10) Patent No.: US 12,468,371 B2
(45) Date of Patent: Nov. 11, 2025

(54) FREQUENCY-VOLTAGE CONTROL FOR INPUT CURRENT LIMIT CIRCUIT

(71) Applicant: NVIDIA Corporation, Santa Clara, CA (US)

(72) Inventors: Ziyi Xu, Shenzhen (CN); Zheng Wu, San Jose, CA (US); Ben Pei En Tsai, Uusimaa (FI); Xuan Wang, Xuzhou (CN)

(73) Assignee: NVIDIA Corporation, Santa Clara, CA (US)

( * ) Notice: Subject to any disclaimer, the term of this patent is extended or adjusted under 35 U.S.C. 154(b) by 88 days.

(21) Appl. No.: 18/222,936

(22) Filed: Jul. 17, 2023

(65) Prior Publication Data
US 2025/0028378 A1    Jan. 23, 2025

(51) Int. Cl.
*G06F 1/324* (2019.01)
*H03L 7/099* (2006.01)

(52) U.S. Cl.
CPC ............ *G06F 1/324* (2013.01); *H03L 7/0991* (2013.01)

(58) Field of Classification Search
CPC ....... G06F 1/324; G06F 1/3296; H03L 7/0991
See application file for complete search history.

(56) References Cited

U.S. PATENT DOCUMENTS

| | | | | |
|---|---|---|---|---|
| 2005/0285654 | A1* | 12/2005 | Kim | G06F 1/3203 |
| | | | | 327/291 |
| 2007/0121771 | A1* | 5/2007 | Yamada | G06F 1/04 |
| | | | | 375/362 |
| 2007/0257713 | A1* | 11/2007 | Engl | G06F 1/324 |
| | | | | 327/113 |
| 2012/0054503 | A1* | 3/2012 | Hsiao | G06F 1/324 |
| | | | | 713/300 |
| 2018/0173298 | A1* | 6/2018 | Gendler | G06F 1/3296 |
| 2021/0081016 | A1* | 3/2021 | Hovis | G06F 1/324 |
| 2021/0336626 | A1* | 10/2021 | Matei | H02M 1/15 |
| 2024/0072808 | A1* | 2/2024 | Chen | G06F 1/3296 |

* cited by examiner

*Primary Examiner* — Hyun Soo Kim
(74) *Attorney, Agent, or Firm* — Lowenstein Sandler LLP

(57) ABSTRACT

Technologies directed to input current limiter (ICL) circuits with frequency control loops are described. One integrated circuit includes a processing core and an ICL circuit. The ICL circuit can limit an input current to the processing core within a current limit of the processing core. The ICL circuit can determine an input current and a supply voltage provided to the processing core at a first time. The ICL circuit can reduce a clock of the processing core from a first clock frequency to a second clock frequency with a linear frequency drop based on the current limit, the input current, and the supply voltage. value, the second value, and the third value. The first clock frequency corresponds to a first voltage, and the second frequency corresponds to a second voltage. The ICL circuit can reduce the clock to a third clock frequency corresponding to a third voltage.

20 Claims, 5 Drawing Sheets

FREQUENCY-VOLTAGE CONTROL FOR INPUT CURRENT LIMIT CIRCUIT

TECHNICAL FIELD

At least one embodiment pertains to frequency-voltage control for an input current limit circuit based on load conditions. For example, at least one embodiment pertains to technology for directly controlling the frequency to speed up loading of a processing core.

BACKGROUND

Frequency-voltage control (FVC) is a technique used to regulate an output voltage of a voltage regulator while maintaining a limit on an input current. This technique is commonly used in power electronics applications, such as DC-DC converters, AC-DC rectifiers, and inverters. In FVC, the frequency and voltage of the power converter are controlled in such a way that the output voltage is maintained at a desired level while the input current is limited to a predetermined value. This is achieved by adjusting the frequency and voltage of the converter based on the load conditions and the desired output voltage. When the load is light (the input supply current is less than a target limit value, the frequency and frequency of the converter can be increased for higher performance. Similarly, when the load is heavy (the input current is greater than the target limit value), the loading should be reduced to reduce the input current. As the loading is express as a function of voltage and frequency, the voltage and frequency need to be reduced to reduce the load. FVC is an effective technique for maintaining input current limits because it provides a dynamic response to load changes. By adjusting the frequency and voltage of the converter in real time, FVC can quickly respond to changes in load conditions and limit the input current to the desired level. FVC can also be used in conjunction with other voltage regulation techniques, such as feedback control, to further improve the performance of the voltage regulator.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
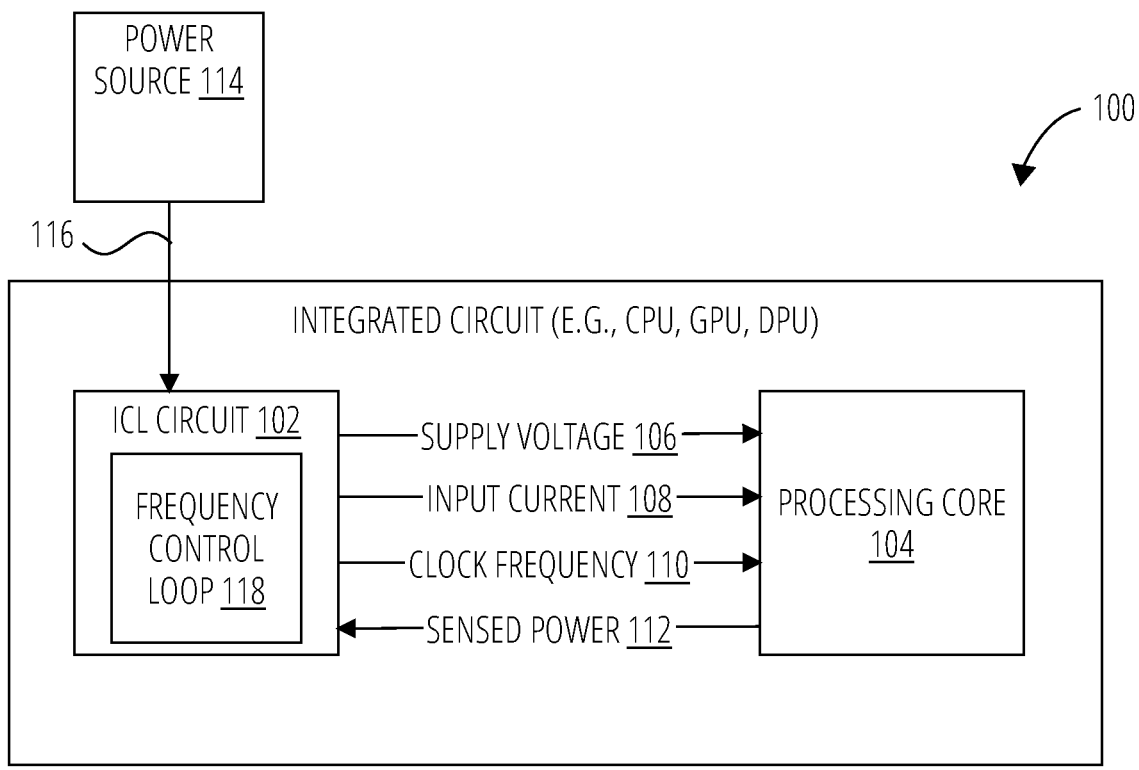
FIG. 1 is a block diagram of an integrated circuit with an input current limiter (ICL) circuit with a frequency control loop to control power of a processing core according to at least one embodiment.

As described above, FVC can be used to maintain input current limits based on load changes by adjusting the frequency and the voltage. For example, a processing core can be idle and then transition to a heavy load, which causes a current surge as most of the transistors of the processing core are switching at a maximum frequency. An input current limiter (ICL) circuit can be used to control a supply voltage and a clock frequency in response to the increase in input current. The ICL circuit can include a voltage regulator (VR) that lowers the voltage to prevent the spike in current from exceeding a current limit corresponding to a power limit.

Conventionally, an ICL control loop can be used to control a supply voltage of the load (e.g., voltage drain to drain (VDD)) and a clock frequency of the load. The VDD is a voltage reference for the supply voltage in electronic circuits, especially digital circuits, where it is used to power the transistors or other active components of the circuit. VDD is commonly used in Complementary Metal-Oxide-Semiconductor (CMOS) digital circuits, which are widely used in microprocessors, a central processing unit (CPU), a graphics processing unit (GPU), or other processing cores, memory chips, or other digital devices. In these circuits, VDD represents the positive supply voltage that powers the circuit. Other voltage references can be used, such as voltage source to source, which represents the negative supply voltage. VDD can also be referred to as a rail voltage.

In the conventional control loops, the control loop first directly adjusts the supply voltage (VDD) using a power voltage regulator (VR) block, which causes a frequency-locked loop (FLL) block to adjust the clock frequency in response to the adjustment to the supply voltage. By reducing the supply voltage first and subsequently reducing the clock frequency, the supply voltage can only reach an intersection point corresponding to a minimum voltage of the VR block. The ICL control loop needs to have a fast response to reduce an overshoot spike of input current when loading a processing core (e.g., a graphics processing unit (GPU), a central processing unit (CPU), or the like). For example, GPU loading refers to the amount of work to be performed by a GPU at a given time. GPUs are specialized hardware components that perform complex mathematical operations required for rendering images, video processing, graphics-intensive applications, machine learning operation, or the like. GPU loading can vary depending on the specific application and the complexity of the operations. GPU loading is often measured as a percentage of a total processing capacity of the GPU. For example, if a GPU has a total processing capacity of 100% and is currently processing 70% of that capacity, then the GPU dynamic loading is 70%. GPU dynamic loading can be expressed as $CV^2F$, where C is the capacitance, V is the input voltage, which is squared, and f is the clock frequency.

A loading speed of the processing core by the ICL control loop may not be fast enough in a voltage drop because of the response delay and slew rate limitations of the VR block. An overshoot of the input current can occur if the voltage does not drop fast enough. The VR block has a reaction delay from the changed input. The slew rate is limited due to the VR block's bandwidth (e.g., normally 70 KHz) and circuit inductance value. From the perspective of a supply voltage, the ideal drop to an intersect point of VF curve, e.g., 900 mV (millivolts,) should happen as fast as possible (e.g., within twenty microseconds (μsecs)). That is, the supply voltage should reach a setting target before an input current ramps to a peak within the twenty μsecs. However, due to the VR slew rate and delay, the supply voltage reacts much slower than the demand. For example, the ICL control loop can include a proportional-integral-derivative controller (PID)

control block, whose derivative "D" part needs to react as fast as possible to changes in the loading. Normally, the "D" part should reach a setting target within twenty μsecs. After the supply voltage reaches the intersection point (Vmin), the control loop reduces the frequency with a fixed ratio to further reduce the frequency. The control loop can use a fixed ratio frequency divider (LDIV) (e.g., 1/2, 1/3, or the like) to further reduce the frequency after reaching the intersection point. This is not linear behavior. Rather, the control loop uses a bang-band control method that causes extra overshoot and undershoot due to the LDIV rapid on/off.

Aspects and embodiments of the present disclosure overcome the deficiencies described above and others by providing a control loop that directly adjusts frequency first. The voltage-frequency curve can be referenced to select the VR target voltage. The frequency responds much faster than the VR setting voltage. The "D" part can be more effectively controlled. Although the voltage drop may be slow, reducing the frequency first can adjust the loading (e.g., GPU $CV^2F$) faster than before. Aspects and embodiments of the present disclosure can use an internal ADC and DVCO block to inject a virtual voltage drop into the control loop. The internal ADC and DVCO block can reduce the core loading much faster. In at least one embodiment, the FLL can be noise aware using the PID control block described herein. Alternatively, the FLL can use a state-space controller, a neural network, or the like to compensate for noise. The main advantage of using an internal ADC and DVCO block is that it can improve the performance of the ICL circuit by directly changing a core clock, which can react much faster than waiting for a voltage regulator (VR) to respond. This is particularly important in applications where the ICL circuit operates in a noisy environment or variable and unpredictable load conditions. In other embodiments, an FLL can be used instead of a noise-aware frequency-locked loop (NAFLL). A NAFLL clock can be reduced faster than an external rail speed of the supply voltage (VDD), resulting in a faster adjustment due to the change in loading. The NAFLL clock can be modified to further reduce the frequency to a target point ("T"). The linear frequency drop can reduce the ringing in the supply voltage and ripples in the input current, as described in more detail herein. Aspects and embodiments of the present disclosure can provide a technique for moving a GPU/CPU/core to a new voltage-clock frequency setting more quickly with less input current ripple.

FIG. 1 is a block diagram of an integrated circuit 100 with an ICL circuit 102 with a frequency control loop 118 to control power of a processing core 104 according to at least one embodiment. The integrated circuit 100 is coupled to a power source 114. The power source 114 can provide input power 116 to the integrated circuit 100. The processing core 104 can be a processor core of a central processing unit (CPU), a core of a graphics processing unit (GPU), a core of a data processing unit (DPU), or the like. The integrated circuit 100 includes an ICL circuit 102 that can control the power delivery to the processing core 104 using frequency control loop 118. The ICL circuit 102 can control a supply voltage 106 (e.g., rail voltage), an input current 108, and a clock frequency 110 supplied to the processing core 104. It should be noted that additional details of the ICL circuit 102 are described below with respect to FIG. 2. The ICL circuit 102, using the frequency control loop 118, can reduce a clock frequency of the processing core 104 first and then set a voltage regulator (VR) target voltage referring to a voltage-frequency (VF) curve. The frequency response is much faster than setting the VR setting voltage first. The "D" parameter can be more effective when using a PID control block, as described below. Although the voltage drop of the VR can still be slow, the frequency reduction first can reduce a loading speed of the processing core 104 as compared to directly adjusting the voltage first.

During operation, the ICL circuit 102 uses the frequency control loop 118 to limit the input current 108 provided to the processing core 104 within a first value representing a current limit of the processing core 104. The first value representing the current limit can be predefined or programmable. The first value can be stored in a register or other memory location. In some embodiments, the input current 108 is first input into a VR before being provided to the processing core 104. The ICL circuit 102 can receive or otherwise measure a sensed power 112 of the processing core 104, including a sensed voltage, a sensed current, a resistance, or other metrics of the processing core 104. The processing core 104 can include sensing circuitry (or a circuit board upon which the processing core 104 is located) that measures the actual current and voltage of the processing core 104 and report the sensed power 112 to the ICL circuit 102. In at least one embodiment, voltage and current sensors can measure an output voltage and input current provided to processing core 104 and provide these measurements as feedback signals to the ICL circuit 102. In various embodiments, the ICL circuit 102 limits input current and uses the sensed current as an input to the frequency control loop 118. The ICL circuit 102 can determine, from the sensed power 112, a second value representing the input current 108 of the processing core 104 at a first time. The ICL circuit 102 can determine a third value representing the supply voltage 106 of the processing core 104 at the first time. The ICL circuit 102 can reduce the clock frequency 110 of the processing core 104 from a first clock frequency to a second clock frequency with a linear frequency drop based on the first value, the second value, and the third value. The first clock frequency corresponds to a first voltage. The second clock frequency can be a target frequency point corresponding to a second voltage lower than the first voltage. The ICL circuit 102 can determine a fourth value representing the input current 108 of the processing core 104 at a second time. The ICL circuit 102 can determine a fifth value representing the supply voltage 106 of the processing core 104 at the second time. The ICL circuit 102 can reduce the clock frequency 110 of the processing core 104 from the second clock frequency to a third clock frequency based on the first value, the fourth value, and the fifth value. The third clock frequency corresponds to a third voltage.

Unlike the conventional approach that controls voltage directly, the ICL circuit 102 can control frequency directly. This will speed up the ICL circuit 102 to reduce the loading time of the processing core 104. The ICL circuit 102 directly reduces the clock frequency first, then the corresponding lower voltage target will refer to the V-F curve for the voltage setting value. The $CV^2F$ loading of the processing core 104 can be reduced quickly as the frequency reacts faster than an external VR loop having a VR bandwidth of 70 KHz level. The ICL circuit 102 can provide a linear way to reduce the clock frequency 110, keeping a ripple in the input current more stable. As described below, the ICL circuit 102 can provide a linear drop in the clock frequency 110 using a virtual voltage drop in the NAFLL ADC output. Using the actual sensed voltage and the virtual voltage drop, the NAFLL can operate within the current limits. The virtual voltage drop can set the NAFLL clock further even when the sensed voltage reaches the minimum value. As described herein, the ICL circuit 102 can linearly use the frequency control loop 118 to change the clock frequency 110 for loading the processing core 104.

In at least one embodiment, the ICL circuit 102 includes frequency control loop 118. The frequency control loop 118 can determine a first offset value corresponding to a first difference between the first value and the second value. The frequency control loop 118 can determine a second offset value based on the third value. The frequency control loop 118 can determine a first frequency identifier corresponding to the second clock frequency using the first offset value and the second offset value. The frequency control loop 118 can determine a first voltage identifier associated with the first frequency identifier using voltage-frequency (VF) curve data. The first voltage identifier corresponds to the second voltage. In at least one embodiment, the second value is derived from a load of the processing core at the first time, and the fourth value is derived from the load of the processing core at the second time.

In a further embodiment, the frequency control loop 118 can determine a third offset value corresponding to a second difference between the first value and the fourth value. The frequency control loop 118 can determine a fourth offset value based on the fifth value. The frequency control loop 118 can determine a second frequency identifier corresponding to the third clock frequency using the third offset value and the fourth offset value. Using the VF curve data, the frequency control loop 118 can determine a second voltage identifier associated with the second frequency identifier. The second voltage identifier corresponds to the third voltage.

In at least one embodiment, the frequency control loop 118 can reduce the clock from the first clock frequency to the second clock frequency with the linear frequency drop faster than a voltage drop between the first voltage and the second voltage. In at least one embodiment, the linear frequency drop can reduce a ripple in the input current 108.

In at least one embodiment, the frequency control loop 118 includes a PID control block to receive an error value between the first value and the second value and to provide a first offset value. The frequency control loop 118 includes a frequency-locked loop (FFL) block coupled to the PID control block that receives the first offset value from the PID control block and a second offset value based on the third value representing the supply voltage of the processing core 104 at the first time. The FLL block can provide a first frequency identifier corresponding to the second clock frequency based on the first offset value and the second offset value. The frequency control loop 118 includes a look-up table (LUT). In response to receiving the first frequency identifier, the LUT provides a first voltage identifier corresponding to the second voltage. The LUT can store V-F curve data. In this case, the input is the frequency identifier, and the output is a voltage identifier. The frequency control loop 118 includes a VR block that can receive the first voltage identifier and provide the second voltage to the processing core 104.

In at least one embodiment, the ICL circuit 102 includes a noise-aware frequency-locked loop (NAFLL). The NAFLL can include a proportional-integral-derivative controller (PID) control block that can provide a first offset value representing a virtual voltage drop. The NAFLL can include an analog-to-digital converter (ADC) to convert the supply voltage to a second offset value representing an actual voltage drop. The NAFLL can include a digital voltage-controlled oscillator (DVCO) coupled to the PID control block and the ADC. The DVCO can receive a third offset value based on the first offset value and the second offset value and provide a first clock setting for the clock of the processing core. A first voltage setting for the supply voltage of the processing core can be derived from the first clock setting. An example of the frequency control loop 118 is illustrated and described below with respect to FIG. 2.

Figure 2:
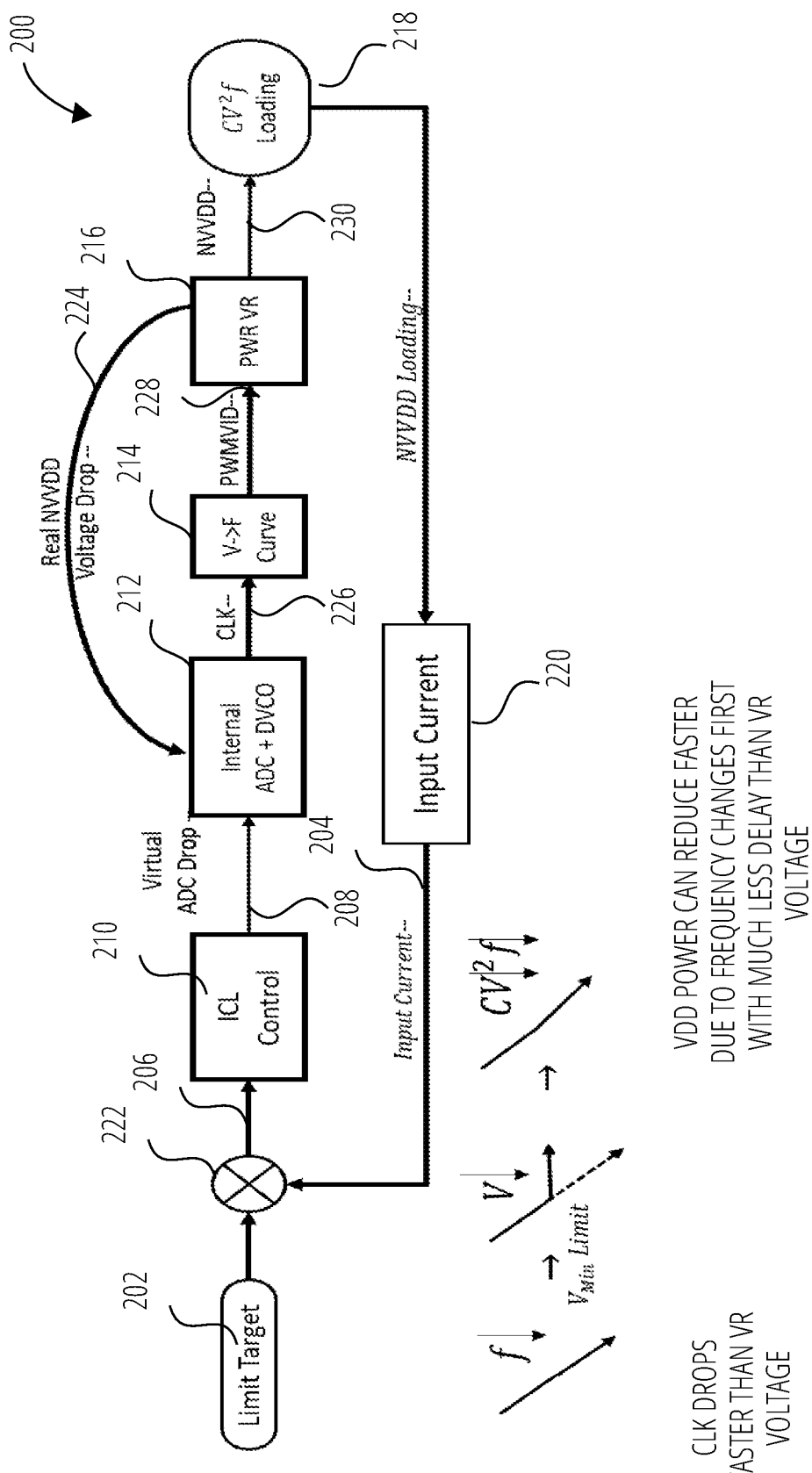
FIG. 2 is a block diagram illustrating an ICL control loop according to at least one embodiment.

FIG. 2 is a block diagram illustrating an ICL control loop 200 according to at least one embodiment. The ICL control loop 200 can be implemented by the ICL circuit 102 of FIG. 1. The blocks of the ICL control loop 200 represent operations being performed by the ICL circuit 102. The ICL control loop 200 includes one or more logic blocks to control the voltage and frequency of a processing device for $CV^2F$ loading. One or more logic blocks include an ICL control block 210, an internal ADC and DVCO block 212, a V-F curve block 214, a power VR block 216, and a current sensing block 220. The ICL control loop 200 can have a target value 202, corresponding to a current limit of a processing core. The processing core can be a GPU core, a CPU core, a core of a data processing unit (DPU), or another circuit with a load that needs to be current limited to the target value 202. Using the current sensing block 220, the ICL control loop 200 can measure a current value 204 corresponding to an input current measured at the processing core. The ICL control loop 200 can determine a first offset value 206 corresponding to a first difference between the target value 202 and the current value 204. For example, a subtraction block 222 can determine an error between target value 202 and current value 204 and output the error as the first offset value 206 to the ICL control block 210. In at least one embodiment, an error amplifier can compare the target value 202 and the actual current value 204 and generate an error signal that is used to adjust the frequency and voltage by the ICL control loop 200. The ICL control loop 200 can process the feedback signals from the voltage and current sensors and the error signal to adjust the frequency and voltage as described herein. In at least one embodiment, the ICL control block 210 can be used to determine how to adjust the frequency first, followed by the voltage. In at least one embodiment, an oscillator can be used to generate a periodic waveform with a frequency that is proportional to the desired output frequency. In at least one embodiment, a pulse width modulation (PWM) generator can be used to generate a modulated signal that is used to control the frequency and the voltage response to the load conditions. Using the FVC techniques described herein, the ICL control loop 200, including the voltage regulator (VR) block, can adjust to changes in the load and maintain a stable output voltage while limiting the input current to the processing core.

In at least one embodiment, the ICL control block 210 can use the first offset value 206 to determine a virtual voltage drop 208. The internal ADC and DVCO block 212 can receive the virtual voltage drop 208 from the ICL control block 210. The internal ADC and DVCO block 212 can also receive a sensed voltage 224 output by the power VR block 216. Using the virtual voltage drop 208 and sensed voltage 224, the internal ADC and DVCO block 212 can provide a clock frequency identifier to the V-F curve block 214. An example of the internal ADC and DVCO block 212 is illustrated and described below with respect to FIG. 3. The V-F curve block 214 can use the clock frequency identifier to determine a voltage identifier 228 to provide to the power VR block 216. The power VR block 216 uses the voltage identifier 228 to output a supply voltage 230 to the processing core. The $CV^2F$ loading block 218 is not logic or a circuit but represents the supply voltage, supply current, and the clock frequency provided to the processing core. The current sensing block 220 can sense the input current of the processing core and other loading metrics of the processing core. In this manner, the ICL control loop 200 changes the frequency linearly, while the voltage can continue to drop linearly, resulting in a faster loading at $CV^2F$ loading block 218.

In at least one embodiment, the ICL control loop 200 can determine a first offset value (e.g., virtual voltage drop 208) corresponding to a first difference between the target value 202 and the current value 204. The ICL control loop 200 can determine a second offset value based on the sensed voltage 224. The ICL control loop 200 can determine a first frequency identifier (e.g., 226) corresponding to a second clock frequency (lower clock frequency) using the first offset value (e.g., 208) and the second offset value based on the sensed voltage 224. Using VF curve data, the ICL control loop 200 can determine a first voltage identifier (e.g., 228) associated with the first frequency identifier. The first voltage identifier corresponds to a second voltage that is lower than an initial voltage. In this manner, the supply power (VDD) can reduce faster due to the frequency changes first with much less delay than the VR voltage drop approach since the clock drops faster than the VR voltage.

The ICL control loop 200 can continue by determining a third offset value (e.g., a new value for 228) corresponding to a second difference between the target value 202 and a new current value 204. The ICL control loop 200 can determine a fourth offset value based on a new value for sensed voltage 224. The ICL control loop 200 can determine a second frequency identifier corresponding to a third clock frequency using the third offset value and the fourth offset value. Using the VF curve data, the ICL control loop 200 can determine a second voltage identifier associated with the second frequency identifier. The second voltage identifier corresponds to the third voltage, which is lower than the second voltage.

Figure 3:
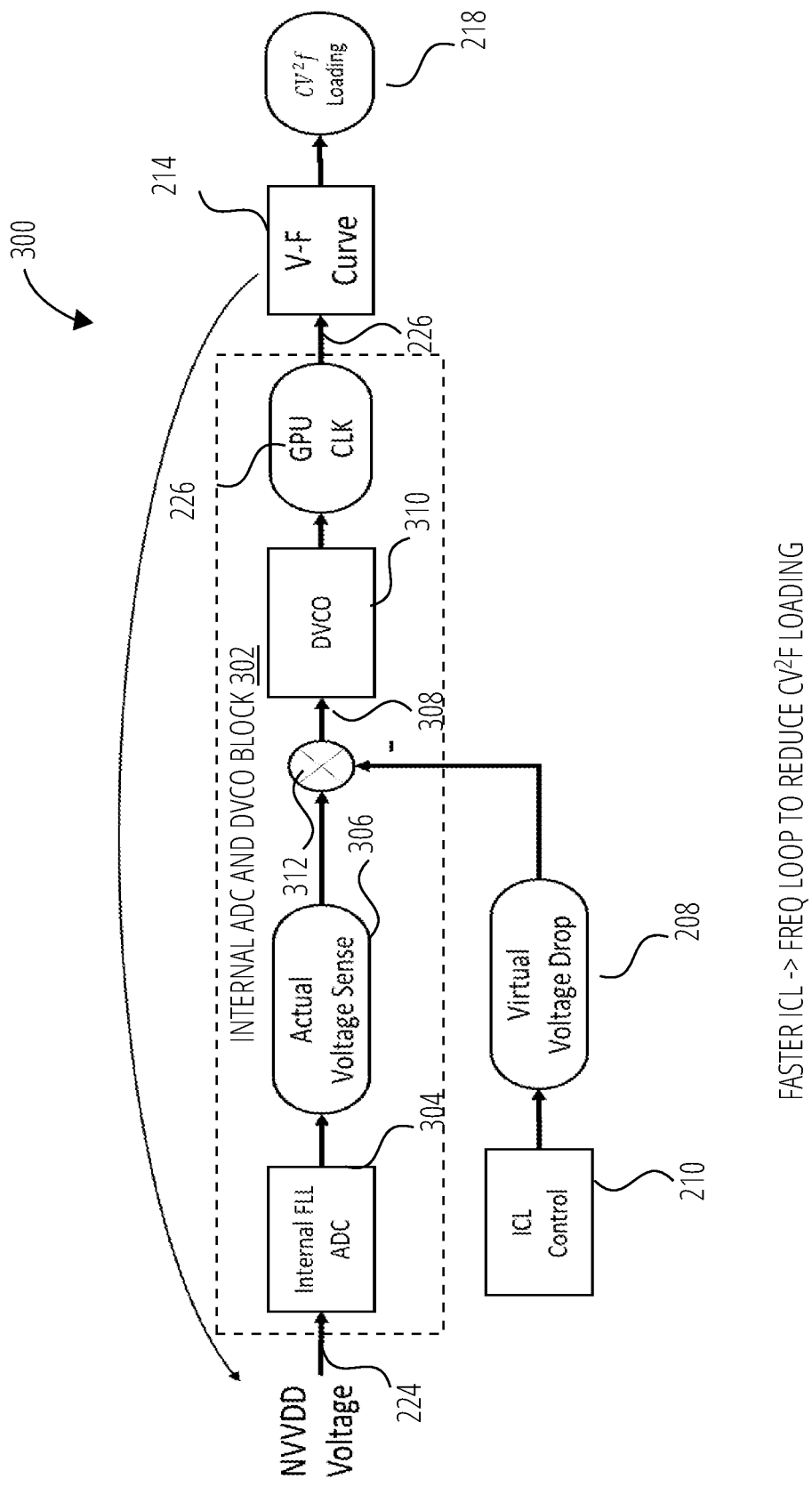
FIG. 3 is a block diagram of an ICL control loop with an internal analog-to-digital converter (ADC) and digital voltage-controlled oscillator (DVCO) block according to at least one embodiment.

FIG. 3 is a block diagram of an ICL control loop 300 with an internal ADC and DVCO block 302 according to at least one embodiment. The internal ADC and DVCO block 302 includes an analog-to-digital converter (ADC) 304 that can sample an output voltage of the VR block (not illustrated in FIG. 3), referred to as the sensed voltage 224. The ADC 304 can provide a digital sensed voltage 306. The digital sensed voltage 306 can be an offset value based on a sensed voltage 224. The NAFLL block also receives the virtual voltage drop 208 from the ICL control block 210. The virtual voltage drop 208 can be based on another offset value (e.g., the first offset value 206, which is a first difference between the target value 202 and the current value 204 as described above). The internal ADC and DVCO block 302 can include a subtraction block that subtracts the virtual voltage drop 208 from the digital sensed voltage 306 to produce a combined offset value 308. The internal ADC and DVCO block 302 can include a DVCO 310 that receives the combined offset value 308 to provide a clock frequency identifier 226 (e.g., GPU clock identifier). The internal ADC and DVCO block 302 can provide the clock frequency identifier 226 to the V-F curve block 214 to set the voltage identifier 228, which is used by the VR block (not illustrated in FIG. 3). The supply voltage corresponding to the voltage identifier and the clock frequency corresponding to the clock frequency identifier 226 can be used by $CV^2F$ loading block 218 as described above.

Figure 4:
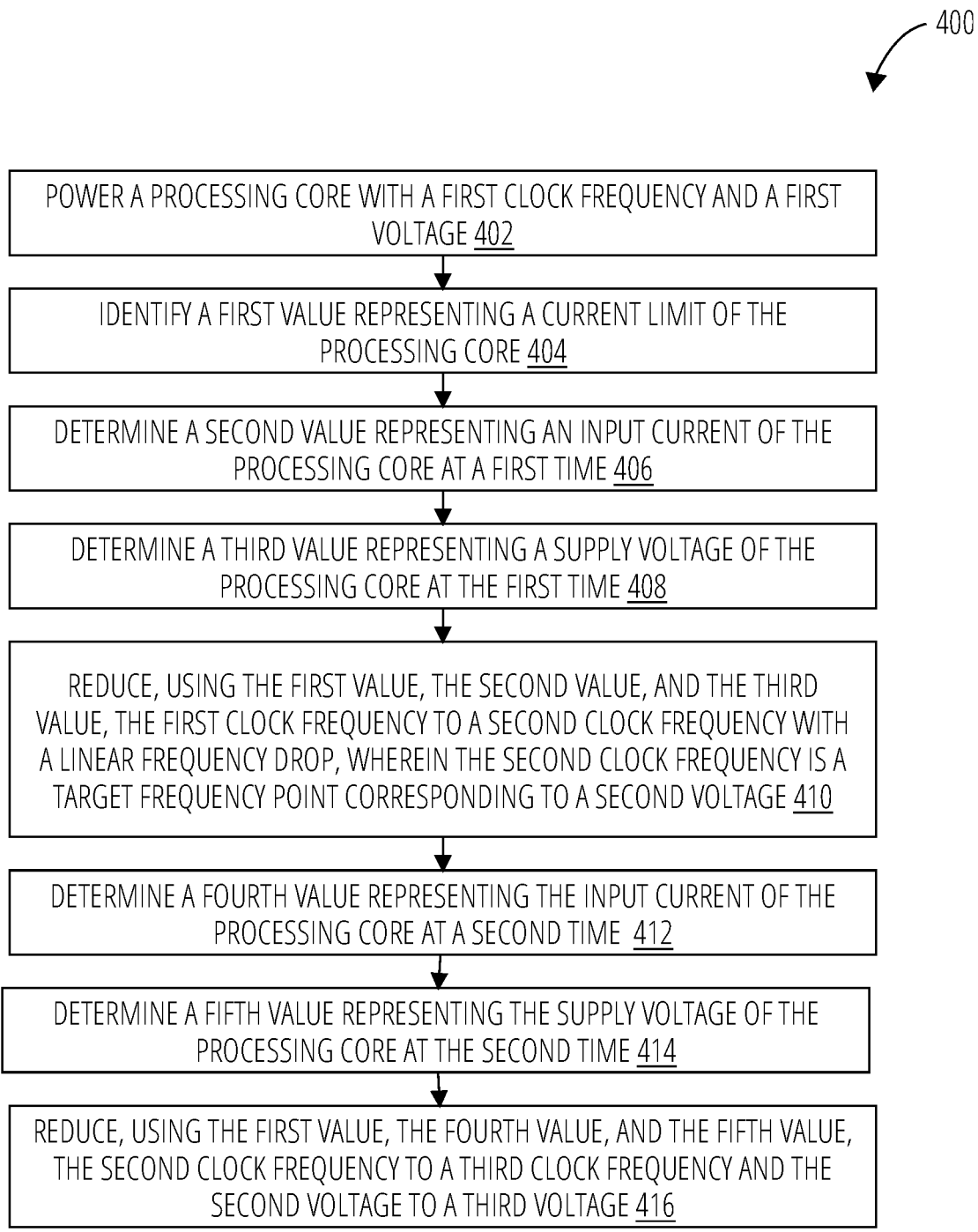
FIG. 4 is a flow diagram of a method for controlling frequency of a processing core according to at least one embodiment.

FIG. 4 is a flow diagram of a method 400 for controlling frequency of a processing core according to at least one embodiment. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by the integrated circuit 100 of FIG. 1. In another embodiment, the method 400 is performed by the ICL circuit 102 of FIG. 1. In another embodiment, the method 400 is performed by frequency control loop 118 of FIG. 1. In another embodiment, the method 400 is performed by ICL control loop 200 of FIG. 2. In another embodiment, the method 400 is performed by ICL control loop 300 of FIG. 3.

Referring to FIG. 4, the method 400 begins with the processing logic powering a processing core with a first clock frequency and a first voltage (block 402). At block 404, the processing logic identifies a first value representing a current limit of the processing core. At block 406, processing logic determines a second value representing an input current of the processing core at a first time. At block 408, processing logic determines a third value representing a supply voltage of the processing core at the first time. At block 410, processing logic reduces, by a control loop using the first value, the second value, and the third value, the first clock frequency, to a second clock frequency with a linear frequency drop, wherein the second clock frequency is a target frequency point corresponding to a second voltage. At block 412, processing logic determines a fourth value representing the input current of the processing core at a second time. At block 414, processing logic determines a fifth value representing the supply voltage of the processing core at the second time. At block 416, the processing logic reduces, by the control loop using the first value, the fourth value, and the fifth value, the second clock frequency to a third clock frequency and the second voltage to a third voltage.

In a further embodiment, the processing logic determines a first offset value corresponding to a first difference between the first value and the second value. The processing logic determines a second offset value based on the third value. The processing logic determines a first frequency identifier corresponding to the second clock frequency using the first offset value and the second offset value. Using VF curve data, the processing logic determines a first voltage identifier associated with the first frequency identifier, wherein the first voltage identifier corresponds to the second voltage.

In another embodiment, the processing logic determines a third offset value corresponding to a second difference between the first value and the fourth value. The processing logic determines a fourth offset value based on the fifth value. The processing logic determines a second frequency identifier corresponding to the third clock frequency using the third offset value and the fourth offset value. Using the VF curve data, the processing logic determines a second voltage identifier associated with the second frequency identifier, wherein the second voltage identifier corresponds to the third voltage.

In a further embodiment, the processing logic reduces the supply voltage in a voltage drop from the first voltage to the second voltage in response to the linear frequency drop. The linear frequency drop is faster than the voltage drop.

In a further embodiment, the second value is derived from a load of the processing core at the first time. The fourth value is derived from the load of the processing core at the second time. The linear frequency drop is to reduce a ripple in the input current.

Figure 5:
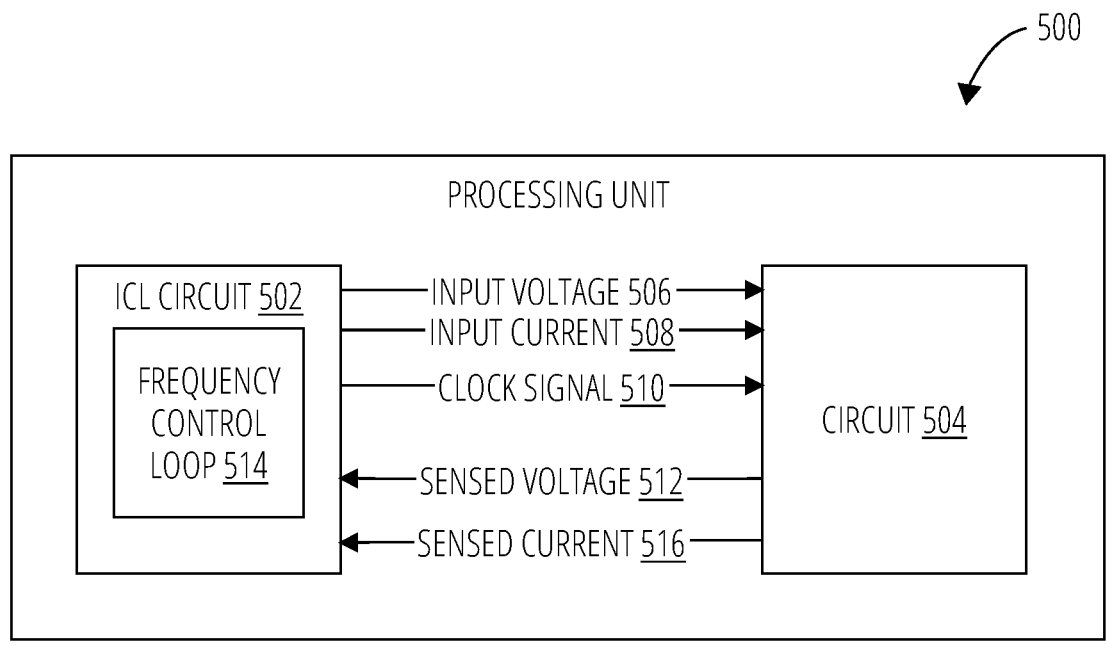
FIG. 5 is a block diagram of a processing unit with an ICL circuit according to at least one embodiment.

FIG. 5 is a block diagram of a processing unit 500 with an ICL circuit 502 according to at least one embodiment.

The processing unit 500 includes a circuit 504. The circuit 504 can be any circuit that operates according to different voltage-frequency (VF) settings while the input current is limited. In at least one embodiment, the circuit 504 can operate at a first VF setting. The ICL circuit 502 can provide, as an input current 508, a first amount of current to the circuit 504 according to the first VF setting. The ICL circuit 502 can also provide, as an input voltage 506, a first voltage to the circuit 504 according to the first VF setting. The ICL circuit 502 can change the first frequency of a clock signal 510 to a second frequency in a first linear frequency drop. A change to the second frequency causes the first voltage of the first VF setting to change to a second voltage lower than the first voltage. The second voltage can be determined based on the second frequency. The ICL circuit 502 can provide, as the input current 508, a second amount of current to the circuit 504 according to a second VF setting. The second VF setting defines the second frequency and the second voltage. The change to the second frequency occurs faster than a change to the second voltage. In at least one embodiment, the second frequency is a target frequency point. In another embodiment, the second frequency is an intermediate frequency point.

In at least one embodiment, the first linear frequency drop reduces a ripple in a transition between the first input current and the second input current of the input current 508 provided to the circuit 504. In at least one embodiment, the first linear frequency drop reduces a ripple in a transition between the first voltage and the second voltage of the input voltage 506 provided to the circuit 504.

In at least one embodiment, the ICL circuit 502 can change the second frequency of the second VF setting to a third frequency in a second linear frequency drop. A change to the third frequency causes the input voltage 506 to change from the second voltage to a third voltage. The ICL circuit 502 can provide, as the input current 508, a third input current to the circuit 504 according to a third VF setting. The third VF setting defines the third frequency and the third voltage. The second linear frequency drop is slower than the first linear frequency drop.

In at least one embodiment, the processing unit 500 is a CPU, a GPU, a DPU, a switch, a processor, a microprocessor, a microcontroller, or the like.

The techniques disclosed herein may be incorporated in any processor that may be used for processing a neural network, such as, for example, a central processing unit (CPU), a GPU, an intelligence processing unit (IPU), a neural processing unit (NPU), tensor processing unit (TPU), a neural network processor (NNP), a data processing unit (DPU), a vision processing unit (VPU), an application-specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, a voice-controlled device, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or alter, generate, or compress an image. For example, such a processor may be employed to enhance an image that is rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a WIFI network, as well as any other wired or wireless networking system) from a rendering device to a display device. Such transmissions may be utilized to stream image data from a server or a data center in the cloud to a user device (e.g., a personal computer, video game console, smartphone, other mobile devices, etc.) to enhance services that stream images such as NVIDIA Geforce Now (GFN), Google Stadia, and the like.

As an example, a processor incorporating the techniques disclosed herein can be employed to process one or more neural networks for any other types of applications that can take advantage of a neural network. For example, such applications may involve translating languages, identifying and negating sounds in audio, detecting anomalies or defects during the production of goods and services, surveillance of living beings and non-living things, medical diagnosis, making decisions, and the like.

Other variations are within the spirit of the present disclosure. Thus, while disclosed techniques are susceptible to various modifications and alternative constructions, certain illustrated embodiments are shown in drawings and described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if something is intervening. Recitation of ranges of values herein is merely intended to serve as a shorthand method of referring individually to each separate value falling within the range, unless otherwise indicated herein. Each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two but can be more when indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors—for example, a non-transitory computer-readable storage medium store instructions and a main central processing unit ("CPU") executes some of the instructions while a graphics processing unit ("GPU") and/or a data processing unit ("DPU")—potentially in conjunction with a GPU)—executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or a similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an interprocess communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An integrated circuit comprising:
   a processing core; and
   an input current limiter (ICL) circuit coupled to the processing core, wherein the ICL circuit is to limit an input current to the processing core within a first value representing a current limit of the processing core, wherein the ICL circuit is to:
   determine a second value representing an input current of the processing core at a first time;
   determine, by a voltage regulator (VR), a third value representing a supply voltage of the processing core at the first time;
   control, by a frequency-locked loop (FLL), a reduction of a clock of the processing core from a first clock frequency to a second clock frequency with a linear frequency drop using on the first value, the second value, and the third value, wherein the first clock frequency corresponds to a first voltage, wherein the second clock frequency is a target frequency point corresponding to a second voltage lower than the first voltage;
   determine a fourth value representing the input current of the processing core at a second time;
   determine, by the VR, a fifth value representing the supply voltage of the processing core at the second time; and
   control, by the FLL, a reduction of the clock of the processing core from the second clock frequency to a third clock frequency using on the first value, the fourth value, and the fifth value, wherein the third clock frequency corresponds to a third voltage.

2. The integrated circuit of claim 1, wherein the ICL circuit comprises a control loop comprising at least the FLL and the VR, wherein the VR is downstream from the FLL, wherein the control loop is to:
   determine a first offset value corresponding to a first difference between the first value and the second value;
   determine a second offset value based on the third value;
   determine a first frequency identifier corresponding to the second clock frequency using the first offset value and the second offset value; and
   determine a first voltage identifier associated with the first frequency identifier using voltage-frequency (VF) curve data, wherein the first voltage identifier corresponds to the second voltage.

3. The integrated circuit of claim 2, wherein the control loop is further to:
   determine a third offset value corresponding to a second difference between the first value and the fourth value;
   determine a fourth offset value based on the fifth value;
   determine a second frequency identifier corresponding to the third clock frequency using the third offset value and the fourth offset value; and
   determine a second voltage identifier associated with the second frequency identifier using the VF curve data, wherein the second voltage identifier corresponds to the third voltage.

4. The integrated circuit of claim 2, wherein the control loop is to reduce the clock from the first clock frequency to the second clock frequency with the linear frequency drop faster than a voltage drop between the first voltage and the second voltage.

5. The integrated circuit of claim 1, wherein the linear frequency drop reduces a ripple in the input current.

6. The integrated circuit of claim 1, wherein the second value is derived from a load of the processing core at the first time, and wherein the fourth value is derived from the load of the processing core at the second time.

7. The integrated circuit of claim 1, wherein the ICL circuit comprises a control loop, wherein the control loop comprises:
   a proportional-integral-derivative (PID) control block to receive an error value between the first value and the second value and to provide a first offset value;
   the frequency-locked loop (FLL) block coupled to the PID control block, the FLL block to receive the first offset value from the PID control block and a second offset value based on the third value representing the supply voltage of the processing core at the first time, the FLL block to provide a first frequency identifier corresponding to the second clock frequency based on the first offset value and the second offset value;
   a look-up table (LUT) to receive the first frequency identifier and provide a first voltage identifier corresponding to the second voltage; and
   the voltage regulator (VR) block to receive the first voltage identifier and provide the second voltage to the processing core.

8. The integrated circuit of claim 1, wherein the FLL is a noise-aware frequency-locked loop (NAFLL), wherein the NAFLL comprises:
   a proportional-integral-derivative (PID) control block to provide a first offset value representing a virtual voltage drop;
   an analog-to-digital converter (ADC) to convert the supply voltage to a second offset value representing an actual voltage drop; and
   a digital voltage-controlled oscillator (DVCO) coupled to the PID control block and the ADC, wherein the DVCO is to receive a third offset value based on the first offset value and the second offset value and provide a first clock setting for the clock of the processing core, wherein a first voltage setting for the supply voltage of the processing core is derived from the first clock setting.

9. The integrated circuit of claim 1, wherein the processing core is at least one of a processor core of a central processing unit (CPU), a core of a graphics processing unit (GPU), or a core of a data processing unit (DPU).

10. A method comprising:
powering a processing core with a first clock frequency and a first voltage;
identifying a first value representing a current limit of the processing core;
determining a second value representing an input current of the processing core at a first time;
determining, by a voltage regulator (VR) a third value representing a supply voltage of the processing core at the first time;
reducing, by a frequency-locked loop (FLL) using the first value, the second value, and the third value, the first clock frequency to a second clock frequency with a linear frequency drop, wherein the second clock frequency is a target frequency point corresponding to a second voltage;
determining a fourth value representing the input current of the processing core at a second time;
determining, by the VR, a fifth value representing the supply voltage of the processing core at the second time; and
reducing, by the FLL using the first value, the fourth value, and the fifth value, the second clock frequency to a third clock frequency and the second voltage to a third voltage.

11. The method of claim 10, further comprising:
determining a first offset value corresponding to a first difference between the first value and the second value;
determining a second offset value based on the third value;
determining a first frequency identifier corresponding to the second clock frequency using the first offset value and the second offset value; and
determining, using voltage-frequency (VF) curve data, a first voltage identifier associated with the first frequency identifier, wherein the first voltage identifier corresponds to the second voltage.

12. The method of claim 11, further comprising:
determining a third offset value corresponding to a second difference between the first value and the fourth value;
determining a fourth offset value based on the fifth value;
determining a second frequency identifier corresponding to the third clock frequency using the third offset value and the fourth offset value; and
determining, using the VF curve data, a second voltage identifier associated with the second frequency identifier, wherein the second voltage identifier corresponds to the third voltage.

13. The method of claim 10, further comprising reducing the supply voltage in a voltage drop from the first voltage to the second voltage in response to the linear frequency drop, wherein the linear frequency drop is faster than the voltage drop.

14. The method of claim 10, wherein the second value is derived from a load of the processing core at the first time, wherein the fourth value is derived from the load of the processing core at the second time, and wherein the linear frequency drop reduces a ripple in the input current.

15. A processing unit comprising:
a circuit to operate at a first voltage-frequency (VF) setting; and
an input current limiter (ICL) circuit coupled to the circuit, wherein the ICL circuit is to:
provide a first input current to the circuit according to the first VF setting;
change, by a frequency-locked loop (FLL), a first frequency of the first VF setting to a second frequency in a first linear frequency drop, wherein a change to the second frequency causes a voltage regulator (VR) to change from outputting a first voltage of the first VF setting to outputting a second voltage lower than the first voltage, wherein the change from the first frequency to the second frequency is at least partially based on the first voltage; and
provide a second input current to the circuit according to a second VF setting comprising the second frequency and the second voltage, wherein the change to the second frequency is to occur faster than a change to the second voltage.

16. The processing unit of claim 15, wherein the first linear frequency drop reduces a ripple in a transition between the first input current and the second input current.

17. The processing unit of claim 15, wherein the first linear frequency drop reduces a ripple in a transition between the first voltage and the second voltage.

18. The processing unit of claim 15, wherein the second frequency is a target frequency point.

19. The processing unit of claim 15, wherein the ICL circuit is further to:
change, by the FLL, the second frequency of the second VF setting to a third frequency in a second linear frequency drop, wherein a change to the third frequency causes the VR to change from outputting the second voltage to outputting a third voltage, wherein the change from the second frequency to the third frequency is at least partially based on the second voltage; and
provide a third input current to the circuit according to a third VF setting comprising the third frequency and the third voltage, wherein the second linear frequency drop is slower than the first linear frequency drop.

20. The processing unit of claim 15, wherein the processing unit is at least one of a central processing unit (CPU), a graphics processing unit (GPU), or a data processing unit (DPU).

* * * * *